US 6,539,483 B1

(12) United States Patent
Harrison et al.

(10) Patent No.: US 6,539,483 B1
(45) Date of Patent: Mar. 25, 2003

(54) SYSTEM AND METHOD FOR GENERATION VPN NETWORK POLICIES

(75) Inventors: Bret Elliott Harrison, Clayton, NC (US); William Donald Reed, Wake Forest, NC (US); Leo Temoshenko, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,831

(22) Filed: Jan. 12, 2000

(51) Int. Cl.[7] .............................................. G06F 11/30
(52) U.S. Cl. ......................................... 713/201; 707/10
(58) Field of Search ................................ 713/200–201; 707/8–10

(56) References Cited

U.S. PATENT DOCUMENTS

| | | | |
|---|---|---|---|
| 5,751,967 A | 5/1998 | Raab et al. ............ | 395/200.58 |
| 5,761,201 A | 6/1998 | Vaudreuil .................... | 370/392 |
| 5,781,624 A | 7/1998 | Mitra et al. ................. | 379/244 |
| 5,797,128 A * | 8/1998 | Birnbaum ...................... | 707/5 |
| 5,842,040 A | 11/1998 | Hughes et al. .............. | 395/831 |
| 5,991,877 A * | 11/1999 | Luckenbaugh ............. | 713/200 |
| 6,167,445 A * | 12/2000 | Gai et al. ................... | 709/223 |
| 6,167,517 A * | 12/2000 | Gilchrist et al. ........... | 713/186 |
| 6,330,560 B1 * | 12/2001 | Harrison et al. ............... | 707/8 |
| 6,330,562 B1 * | 12/2001 | Boden et al. ................. | 707/10 |
| 6,336,138 B1 * | 1/2002 | Caswell et al. ............. | 709/223 |
| 6,353,886 B1 * | 3/2002 | Howard et al. ............. | 713/156 |

FOREIGN PATENT DOCUMENTS

WO    WO 96/11551    * 4/1996    ............ H04Q/3/00

OTHER PUBLICATIONS

Wirbel, Internet Protocol Given Rules for Good Behavior, May 11, 1998, ISSN: 0192–1541, Electronic Engineering Times, n1006, p1(1).*
Virtual Private Networks on Vendor Independent Networks, IBM TDB 09–92 v. 35, n. 4A, p. 326–329.

* cited by examiner

Primary Examiner—James P. Trammell
Assistant Examiner—Mary Wang
(74) Attorney, Agent, or Firm—Gerald R. Woods

(57) ABSTRACT

A system, method and program product for defining a Virtual Private Network (VPN) by the sum of a plurality of policy segments. Each policy segment is composed of a policy segment name, a policy segment type, a VPN device list, a policy template, a quality of service template and a connection type. The policy segment type can include Internet Protocol Security (IPsec), Differential Services (DiffServ) or Reservation Protocol (RSVP). The group of devices in a policy segment are it specified in a device list which is a collection of other device lists and/or device interface profiles. The group of common policy components are specified in a policy template. Policy templates contain the condition and action references that are used to generate policies for the policy segment. The condition reference includes a validity period and a traffic profile. The action reference includes at least one of an IPsec action, a DiffServ action or an RSVP action. The device list, connection type, and policy template are combined to generate all of the policies for a policy segment.

54 Claims, 10 Drawing Sheets

| Policy Component | Relationship |
|---|---|
| Policy Conditions | Policy Must Contain a Validity Period and a Traffic Profile |
| Validity Period | May Be Shared by Multiple Policies |
| Traffic Profile | Unique to Policy (Contains IP Address Information) |
| Policy Actions | Policy Must Contain At Least One Action |
| -- IPSec Action | Must Contain a Key and Data Management Action |
| Key Management Action | May Be Shared by Multiple Policies |
| Key Management Proposal | May Be Shared by Multiple KM Actions |
| Data Management Action | Unique to Policy (Contains IP Address Information) |
| Data Management Proposal | May be Shared by Multiple DM Actions |
| AH Transform | May be Shared by Multiple DM Proposals |
| ESP Transform | May be Shared by Multiple DM Proposals |
| -- Differential Services | May be Shared by Multiple Policies |
| - RSVP Action | May be Shared by Multiple Policies |

FIG. 2

| Field | Description |
| --- | --- |
| -- Identification | |
| Segment Name | The name of the Policy Segment. |
| Directory Order | The order of the definition in the LDAP Server. |
| -- Attributes | |
| Segment Type | The Policy Segment Connection Type. (Mesh, Star, Device Pair, None) |
| Hub Name (STAR ONLY) | The hub name for a Star Segment. |
| Device List | The name of Device List for the Segment. |
| Policy Template | The name of Policy Template for the Segment. |
| -- Status | |
| Segment Component Status | The Policy Segment Component change indicator. |
| Device Member Status | The Device Member change indicator. |
| Device Interface Status | The Device Interface change indicator. |
| Policy Component Status | The Policy Component change indicator. |
| ReGen Policy Segment | Trigger to regenerate Policies for the Segment. (ready, ReGen) |

FIG. 5

SYSTEM AND METHOD FOR GENERATION VPN NETWORK POLICIES

CROSS-REFERENCE TO RELATED APPLICATION

The present application is related to and contains common disclosure with co-pending and commonly-assigned patent application, Ser. No. 09/390,915, filed Sep. 7, 1999 for "System and Method to Test a VPN Policy", the disclosure of which is hereby incorporated by reference.

BACKGROUND OF THE INVENTION

The present invention relates in general to data processing systems, and more particularly, to a system and method for generating Virtual Private Network (VPN) policies for all devices in a computer network.

A Virtual Private Network (VPN) provides end users a means to securely transport information from an intranet across a public Internet Protocol (IP) network such as the Internet. This is accomplished by creating a secure tunnel between two network entities using security mechanisms such as authentication and encryption. A VPN may be made up of layer-2 tunnels, Internet Protocol Security (IPsec) tunnels and policies. The layer-2 tunnels provide VPN capabilities for remote dial-in users. The IPsec tunnels provide VPN capabilities for IP users. The policies provide access control to resources.

IPsec is a framework of open standards for ensuring secure private communications over the Internet. Based on standards developed by the Internet Engineering Task Force (IETF), IPsec ensures confidentiality, integrity, and authenticity of data communications across a public network. IPsec provides a necessary component of a standards-based, flexible solution for deploying a network-wide security policy.

IPsec defines a tunnel mechanism to securely transport IP traffic across a public IP network. IPsec tunnels are actually implemented using a pair of tunnels. There is an IPsec key management and an IPsec data management tunnel, both of which are described more fully below.

IPsec tunneling can directly provide authentication, integrity and encryption. Authentication is the property of knowing that the data received is the same as the data that was sent and that the claimed sender is in fact the actual sender. The IPsec authentication method can be either a manually entered pre-shared key or a digital signature. In addition to authentication, a digital signature guarantees that the message is uniquely associated with the sender and unforgeable by the recipient. Message Digest 5 (MD5: 128 bit hashing) and the Secure Hash Algorithm (SHA: 160 bit hashing) are commonly used algorithms in the IPsec tunnel authentication scheme.

Integrity is the property of ensuring that data is transmitted from the source to the destination without undetected alteration. Hashed Message Authentication Code As Message Digest 5 (HMAC-MD5: 2×128 bit hashing) and the Hashed Message Authentication Code Message Secure Hash Algorithm (HMAC-SHA: 2×160 bit hashing) are the commonly used algorithms in the IPsec integrity scheme.

Confidentiality is the property of communicating such that the intended recipients know what was sent but unintended parties cannot determine what was sent. Encapsulation and encryption are used by IPsec to provide confidentiality. The original IP data packet is encapsulated in an IPsec data packet. The original IP header and payload are encapsulated in tunnel mode which is typically used by gateways. In contrast, only the original payload is encapsulated in transport mode which is typically used by hosts. Data Encryption Standard (DES—56 bit encryption), Triple Data Encryption Standard (DES-3—3×56 bit encryption) and the Commercial Data Masking Facility (CMDF—40 bit encryption) are commonly used in the IPsec encryption scheme.

A security association (SA) is a relationship between a given set of network connections that establishes a set of shared security information. Security associations are negotiated based on secret keys, cryptographic algorithms, authentication algorithms and encapsulation modes. The Diffie-Hellman key agreement protocol (Group-1: 768 bit keying, Group-2: 1024 bit keying) is used by Internet Key Exchange (IKE) to generate a shared secret, i.e., a key, between the two IPsec entities. It should be noted that IKE was formerly known as ISAKMP/Oakley (Internet Security Association Key management Protocol/Oakley). The duration of an SA is specified by a lifetime (duration in seconds) or a life-size (duration in Kbytes).

An IPsec key management tunnel is often referred to as an Internet Key Exchange (IKE) tunnel or an IPsec Phase-1 tunnel and is a control tunnel for one or more follow-on IPsec Phase-2 user-data tunnels. The IPsec key management tunnel is negotiated in either main mode which utilities a six message exchange or aggressive mode which utilities a three message exchange. The negotiation entails authenticating the entities, establishing a shared secret and establishing parameters for the security association. After the successful completion of the negotiation, the IPsec key management tunnel uses a single bi-directional security association (SA) for communication. Throughout the lifetime of a given IPsec key management tunnel, the SA may expire and a new one may be created.

An IPsec data management tunnel is often referred to as an IPsec Phase-2 user-data tunnel or as an IPsec tunnel and is used to securely transport IP traffic. The IPsec data management n tunnel is negotiated in quick mode which utilizes a three message exchange. The negotiation entails exchanging identities, deciding whether or not to enforce replay prevention, generating a key if perfect forward secrecy is required, agreeing on the future handling of the "don't copy" fragment bit and establishing parameters for the security association(s). The security parameters may consist of an authentication header (AH) and/or encapsulating security payload (ESP) processing attributes. While both AH and ESP provide packet integrity and data origin authentication, only ESP provides encryption. The IPsec data management tunnels use one or more inbound SAs and one or more outbound SAs. Throughout the lifetime of a given IPsec data management tunnel, the SA(s) may expire and a new one(s) may be created. During this switch-over period, there are actually two SAs (one with a status of CURRENT and one with a status of EXPIRING) for each original SA.

Authentication is performed on a tunnel basis and optionally on a packet basis. Tunnel authentication is performed by the IKE peers using either a pre-shared key or a digital signature. Packet authentication can be done by either the AH or ESP processing using either the HMAC-MD5 or HMAC-SHA algorithm.

Encryption is optionally performed on a packet basis by the ESP processing. Packet encryption employs either the DES, DES-3 or CMDF algorithm. Integrity is optionally performed on a packet basis. Integrity can be done by either the AH or ESP processing and employs either the HMAC-MMD5 or HMAC-SHA algorithm.

A VPN policy consists of a condition and an action. The condition defines the time frame and traffic characteristics under which the action should be performed. The action is actually a set of actions or sub-actions which are used for IPsec key management, IPsec data management, Differentiated Services (DiffServ) and ReSerVation Setup Protocol (RSVP). When a packet is received from the network, the VPN device searches the defined conditions for a match. If a condition match is found, the VPN devices perform one of more defined actions. Multiple policy instances may be created from a single defined policy.

Defining a VPN policy with the correct set of attributes is not a trivial task. Once a policy has been defined, there may be overlaps and conflicts with other policies defined on the same network device. This may result in unexpected behavior in the network or a loss of traffic due to the IKE negotiation failures.

At present, all networking vendors define VPN policies on a device-by-device basis. For example, in a network having 1000 VPN devices that are to be connected together, the network administrator would have to configure 1000 policies on 1000 devices. Furthermore, if the network administrator wanted to add a device or change a parameter of a policy definition, he would need to repeat or add the change on 1000 devices. The current process is very labor intensive and prone to error.

SUMMARY OF THE INVENTION

The foregoing objective is achieved by the system, method and program product of the present invention in which a Virtual Private Network (VPN) is defined by the sum of a plurality of policy segments. Each policy segment, in turn, is composed of a policy segment name, a policy segment type, a VPN device list, a policy template, a quality of service template, a connection type and a hub name (for star connection types). The policy segment type can include Internet Protocol Security (IPsec), Differential Services (DiffServ) or Reservation Protocol (RSVP), the latter two being quality of service (QoS) policy segment types. For IPsec policy segments, mesh, star and device-to-device connection types are used to describe the topology of the network.

The group of devices in a policy segment are specified in a device list. The device list is a collection of other device lists and/or device interface profiles. A device interface profile contains the device specific information needed to generate traffic profiles and action components for a policy segment. A specific device can have multiple device interface profiles with each having a different definition or view of device specific information.

The group of common policy components are specified in a policy template. Policy templates contain the condition and action references that are used to generate policies for the policy segment. The condition reference includes a validity period and a traffic profile. The action reference includes at least one of an IPsec action, a DiffServ action or an RSVP action.

The device list, connection type, and policy template are combined to generate all of the policies for a policy segment.

BRIEF DESCRIPTION OF THE DRAWINGS

The invention is better understood by reading the following Detailed Description of the Preferred Embodiment in conjunction with the accompanying drawings, wherein:

FIG. 2 illustrates the policy component relationships for a VPN policy.

FIG. 5 illustrates the attributes contained in the policy segment sub-category.

DETAILED DESCRIPTION OF THE PREFERRED EMBODIMENT

Figure 1:
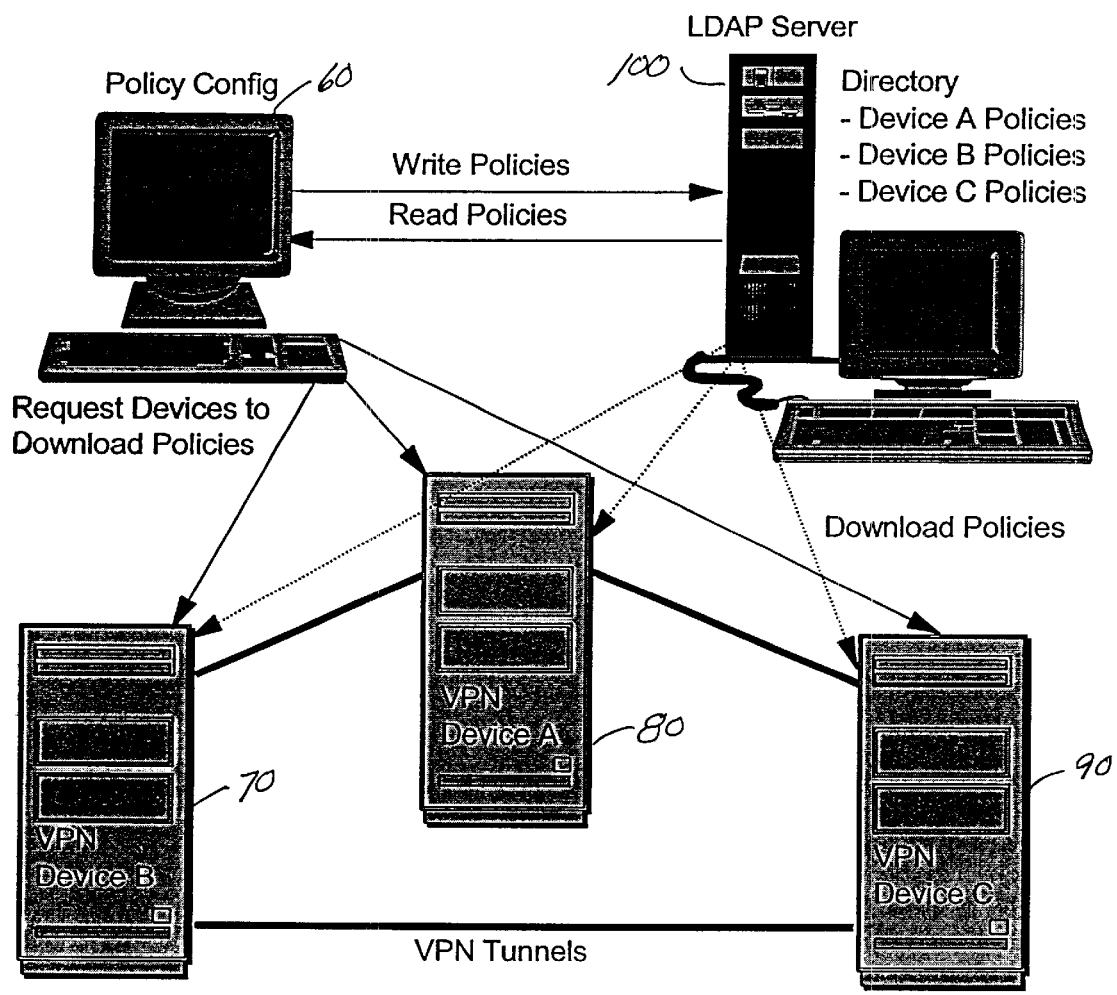
FIG. 1 illustrates the interactions between a policy configuration application, a Light Weight Directory Access Protocol (LDAP) server and VPN devices in the preferred embodiment of the present invention.

A VPN Policy consists of a condition and an action. When a VPN device receives network traffic, the policy conditions are searched for a match. If a condition match is found, the associated action is performed. The following IF-THEN statement illustrates the enforcement of a VPN condition.

IF Network-Traffic MATCHES Condition THEN Perform Action

The condition consists of a validity period and a traffic profile. The validity period defines the time frame in which the action should be performed. The traffic profile defines the type of network traffic for which the action should be performed.

The action is actually composed of one or more sub-actions. These sub-actions can include an IPsec action, a Differential Services (DiffServ) action and a ReSerVation Protocol (RSVP) action. The IPsec action is further composed of an IPsec key management action and an IPsec data management action.

RSVP is a network control protocol that allows Internet applications to obtain special qualities-of-service (QoS's) for their data flows. This generally requires reserving resources along the data paths from source to destination. When an application in an IP host requests a specific QoS for its data stream, RSVP is used to deliver the request to each router along the path of the data stream and to maintain the router and IP host state to provide the requested service.

DiffServ is an architecture that enables service providers to provide a range of network services which are differentiated on the basis of performance in addition to the pricing tiers used in the past. A specific performance level is requested on a packet-by-packet basis by marking the "DS" field of each packet with a specific value. The DS field is a small bit pattern in each packet, in the IPv4 Type of Service (TOS) octet or the IPv6 Traffic Class octet, that is used to mark a packet to receive a particular forwarding treatment, or per-hop behavior, at each network node.

A VPN policy must contain a condition consisting of a validity period and a traffic profile and at least one policy action. The validity period component definition may be used in multiple policies as it does not contain any device specific information. The traffic profile component definition is unique to the policy as it contains device specific IP address information. The key management action and key management proposal component definitions of the IPsec action may be used in multiple policies as neither contains any device specific information. The data management action component definition of the IPsec action is unique to the policy as it contains device specific IP address information. The data management proposal, authentication header (AH) transform and encapsulated security payload (ESP) transform component definitions of the IPsec action may be used in multiple policies as none of them contain device specific information. The Differential Services action and the RSVP action component definitions may be used in multiple policies as neither contains any device specific information. FIG. 2 illustrates the relationships of the components of a VPN policy.

When a connection is to be established, the policy conditions are searched based on the source and destination. If a condition match is found, the actions found in the policy are applied to the traffic. In the case of traffic intended to be secured by IPsec, an IKE (phase 1 and then phase 2) negotiation starts. Once the ISAKMP phase 1 and phase 2 exchanges have completed successfully, an instance of the defined policy is created. Multiple policy instances can be created from a single defined policy.

Figure 3:
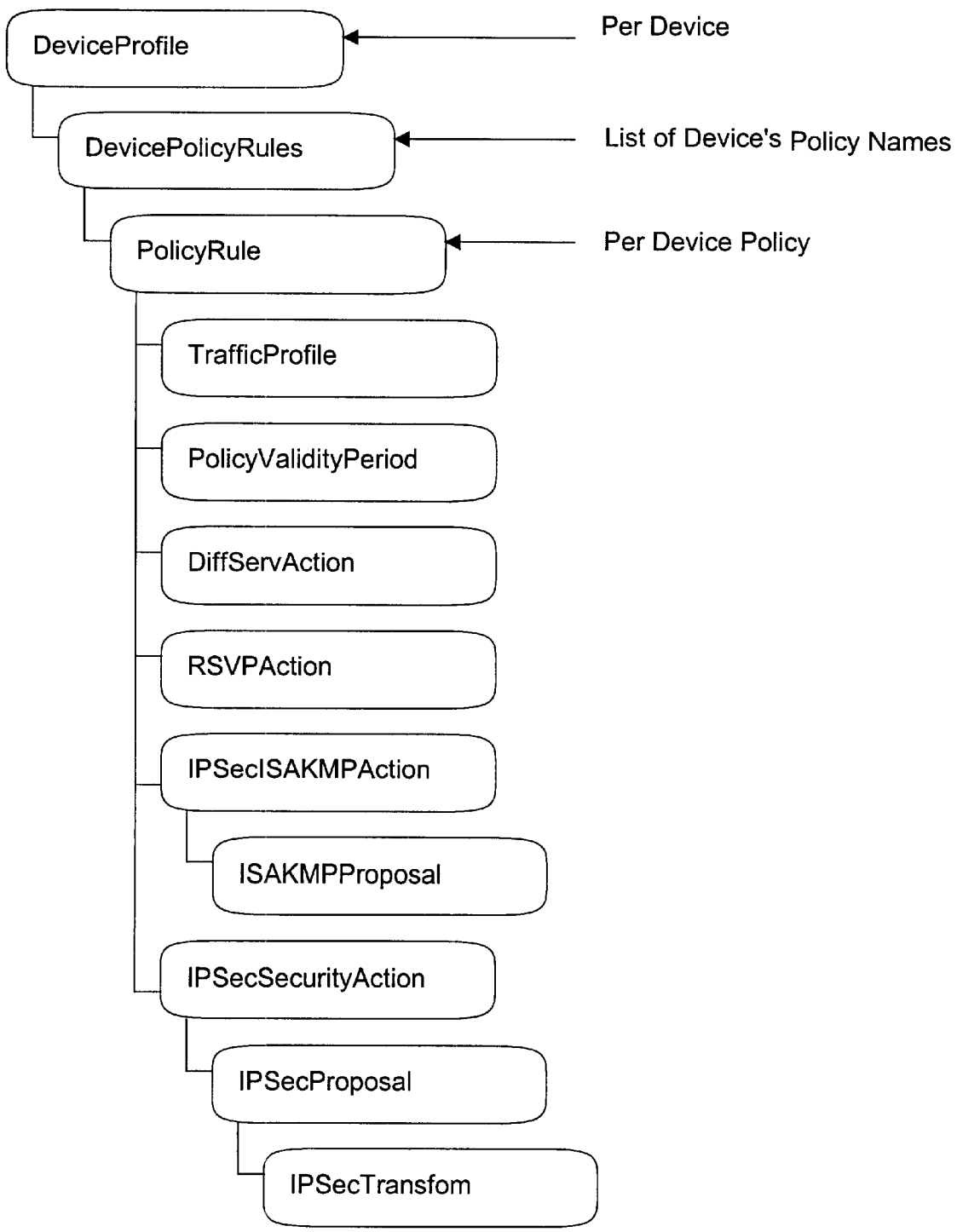
FIG. 3 illustrates the logical storage of a set of VPN policies for a specific VPN device.

In the preferred embodiment, a policy database is loaded or copied to a network device. FIG. 3 illustrates how a set of policies for a specific device are logically stored. It may have been downloaded from a server, provided by a device configuration application or entered from the network device's command line interface. One approach is to use a directory-enabled LDAP server as depicted in FIG. 1 and explained below. Changes made to a directory maintained at an LDAP server will take effect for every directory-enabled application that uses this information.

The Light Weight Directory Access Protocol (LDAP) is an internet directory standard which evolved from the X.500 Directory Access Protocol (DAP) and is capable of providing client devices open access to directory servers on the intranet/internet. The protocol provides this capability by passing text-based exchanges based on a schema between a client and a server over the TCP/IP protocol. One or more schemas may be supported by the client and the server with each schema used to define a collection of related objects.

FIG. 1 illustrates the interactions between a policy configuration application, an LDAP server and the VPN devices. From a VPN perspective, a policy configuration application resident on device 60 and the VPN devices 70, 80, 90 are LDAP clients which communicate with an LDAP server 100. The policy configuration application resident on device 60 interacts with the LDAP server 100 to create, update and delete VPN policies. The VPN devices 70, 80, 90 interact with the LDAP server 100 to retrieve VPN policies. The exchanges between the LDAP clients 70, 80, 90 and LDAP server 100 are based on a policy schema which defines the objects or data which are used to represent a VPN policy.

The policy configuration application resident on device 60 is used to define VPN policies for all VPN devices 70, 80, 90. The VPN policies are stored in an LDAP server 100 and subsequently downloaded to the VPN devices 70, 80, 90 during initialization, upon request from the policy configuration application resident on device 60 or upon request from a VPN monitor application, also resident on device 60.

Currently, all vendors define VPN policies on a device-by-device basis. For example, in order to connect 1,000 VPN devices together would require a network administrator to configure 1,000 policies on 1,000 devices. Furthermore, to add a VPN device or change a parameter of a policy definition would necessitate repeating the add or change on 1,000 devices. If a network administrator intends to connect 1,000 VPN devices in a full mesh configuration, he would need to configure 999 policies on 1,000 devices. Estimating a time of one minute per policy, in order to configure 999,000 policies, it will take a person working eight (8) hours a day, five (5) days a week, 52 weeks a year a total of eight (8) person years to configure.

In the present invention, a VPN network is represented as the sum of all policy segments. A policy segment in turn is a group of devices that need to be connected based on a group of common policy components. Individual policy segments may or may not be connected. A specific policy segment includes a device list, a connection type and a policy template.

The group of devices in a policy segment are specified in a device list. A device list is a collection of other device lists and/or device interface profiles. The embedded device list will eventually resolve to device interface profiles. A device interface profile contains the device specific information such as IP addresses needed to generate the traffic profile and IPsec data management actions to generate the traffic profile and IPsec data management action components for the policy segment. A specific device can have multiple device interface profiles with each having a different definition or view of the device specific information.

A connection between the devices is specified by a connection type. A connection type represents the topology of the policy segment and may be specified as either a mesh, star, or specific device pair configuration. For star configurations, the name of the hub device must also be specified.

The group of common policy components are specified in a policy template. A policy template contains the condition and action references which are used to generate policies for the policy segment. The condition reference includes a validity period and a traffic profile template. A traffic profile template contains all the attributes of a traffic profile with the exception of device specific information such as IP addresses. The action reference includes at least one of the following: an IPsec action, a Differential Services action and an RSVP action. IPsec actions are further composed of a key management action and a data management action template. A data management action template contains all the attributes of a data management action with the exception of device specific information such as IP addresses. The device specific information for the traffic profile and data management action will be obtained from device interface profiles.

Figure 4:
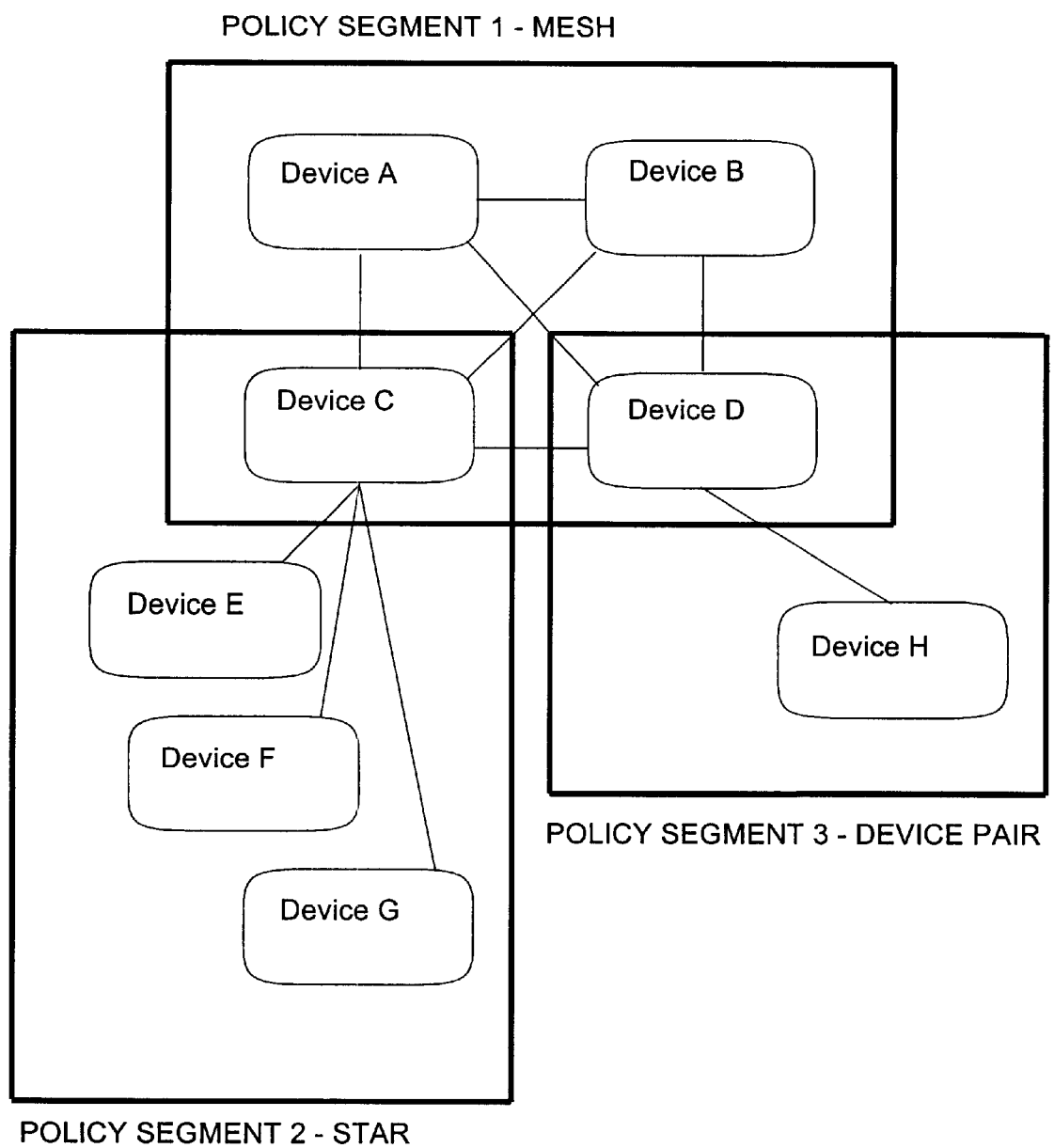
FIG. 4 illustrates an exemplary VPN network having three connected policy segments in accordance with the preferred embodiment of the present invention.

The device list, connection type and policy template are combined to generate all of the policies for the policy segment. FIG. 4 illustrates a VPN network of three connected policy segments. Policy segment 1 forms a mesh connection among device A, device B, device C and device D. Policy segment 2 forms a star connection among device C, device E, device F and device G with device C acting as the hub device. Policy segment 3 forms a specific device connection between device D and device H.

As described above, a policy segment is used to generate policies for a collection of devices based on a connection type and group of common policy components. Devices in one policy segment may or may not be connected. A specific policy segment includes a device list, connection type and policy template. Device lists are user (customer)-defined.

The connection type represents the topology of a policy segment and may be specified as either a mesh, star or specific device pair. Policy templates contain the common policy components. A number of pre-defined policy templates are provided. User(customer)-defined policy templates based on parameters of the user's choice can be created within the in-progress policy configuration.

For the in-progress policy configuration, the "create" button initiates create processing, the "delete" button initiates delete processing and the "apply" button initiate "change" processing. A change to a policy segment does require regeneration of a policy segment. Changes are reflected in the policy segment status. FIG. 5 illustrates the attributes contained in the policy segments sub-category.

Names will be generated for policies, traffic profiles and IPsec data management actions as follows:

<segment-name>+<id>+<generation-order-number> where "id" is P for Policy, T for Traffic Profile and S for IPsec data management action.

Figure 6:
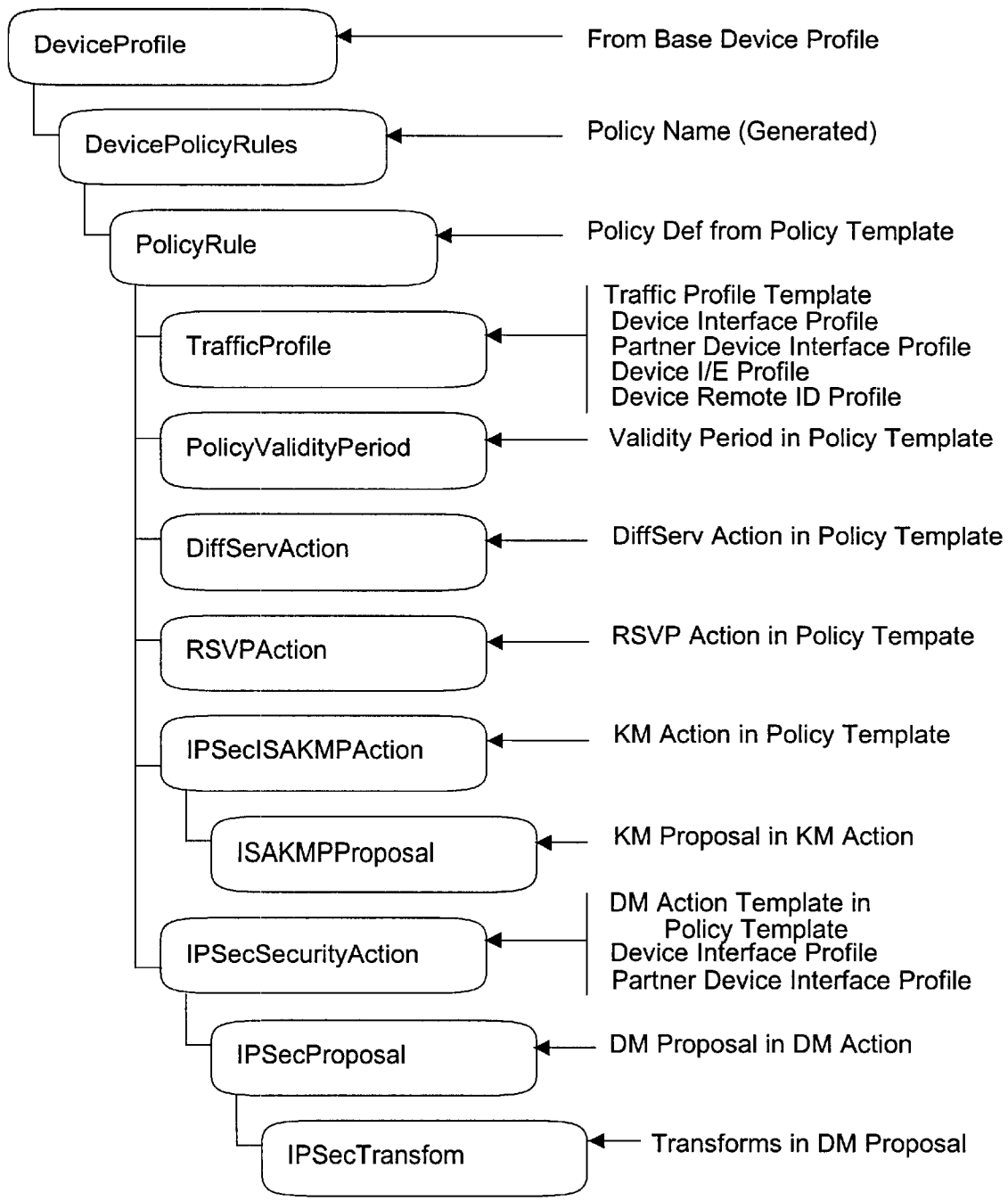
FIG. 6 illustrates the generation of a VPN policy for a specific device.

When a policy segment is regenerated, all existing policies and generated references for the policy segment are first deleted. FIG. 6 illustrates the generation of a specific device policy.

Figure 7:
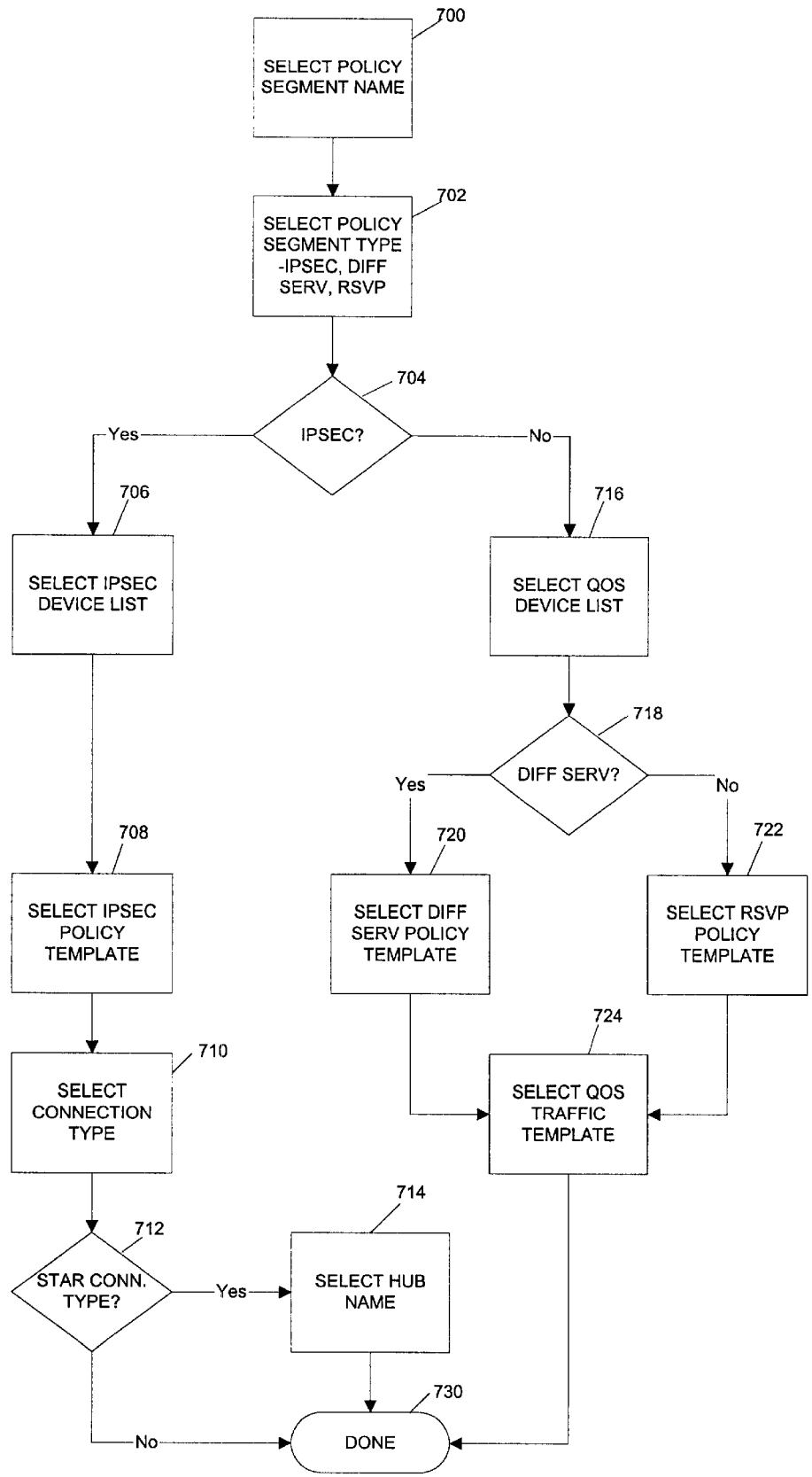
FIG. 7 illustrates the processing logic performed by a manager application to define a policy segment in the preferred embodiment of the present invention.

FIG. 7 illustrates the processing logic associated with defining a policy segment according to the present invention. A policy segment is composed of a policy segment name, a policy segment type, a device list, a policy template, a quality-of-service (QoS) template, a connection type, and a hub name. The policy segment type can be IPsec, which is a security protocol, or DiffServ or RSVP which are QoS protocols. The quality-of-service template is for QoS policy segments only. The connection type can be mesh, star or device-to-device for IPsec policy segments or connection-oriented protocols only. A hub name is used for star connection types.

Processing begins in logic block 700 with the selection of a policy segment name. In logic block 702, a policy segment type is selected from among IPsec, DiffServ and RSVP. In decision block 704 a test is made to determine if the policy segment type selected is IPsec. If IPsec is selected, then in logic block 706 an IPsec device list is selected. Next, in logic block 708, an IPsec policy template is selected. This is followed in logic block 710 with the selection of connection type. Decision block 712 is then entered to determine if a star connection type is selected. If a star connection type is selected, then a hub name is selected in logic block 714. Processing from the IPsec branch exits at termination block 730.

If IPsec was not selected in decision block 704, then the QoS branch is executed. In logic block 716, a QoS device list is selected. In decision block 718, a test is made to determine if DiffServ is the selected policy segment type. If it is, then in logic block 720, a DiffServ policy template is selected. Otherwise, in logic block 722, an RSVP policy template is selected. Whether DiffServ or RSVP is the selected policy template, processing continues in logic block 724 with selection of a QoS traffic template. Processing then exits the QoS branch in termination block 730.

Figure 8A:
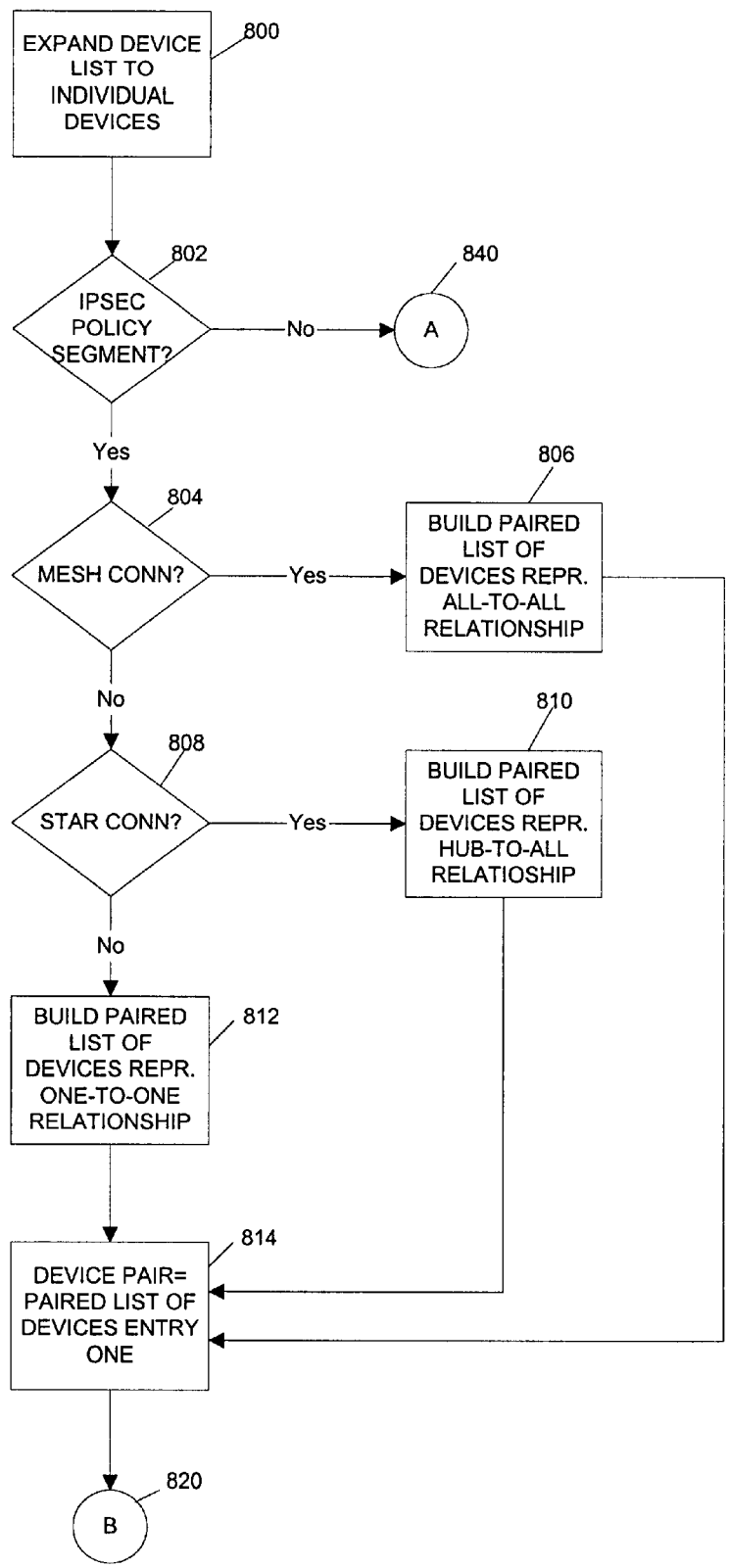
FIGS. 8A–8C illustrate the processing logic performed by a manager application to generate device policies based on a policy segment definition in the preferred embodiment of the present invention.
Figure 8B:
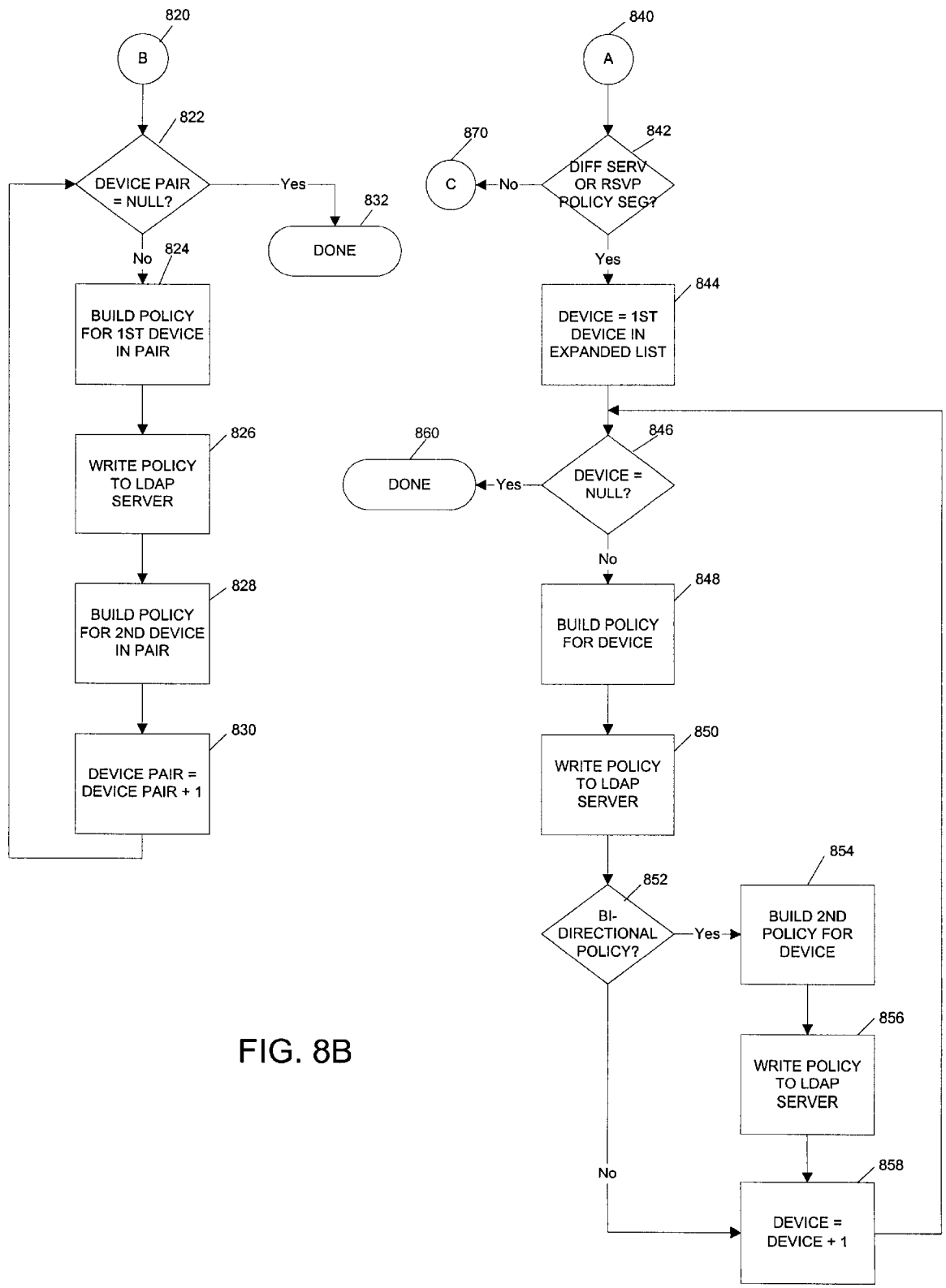
Figure 8C:
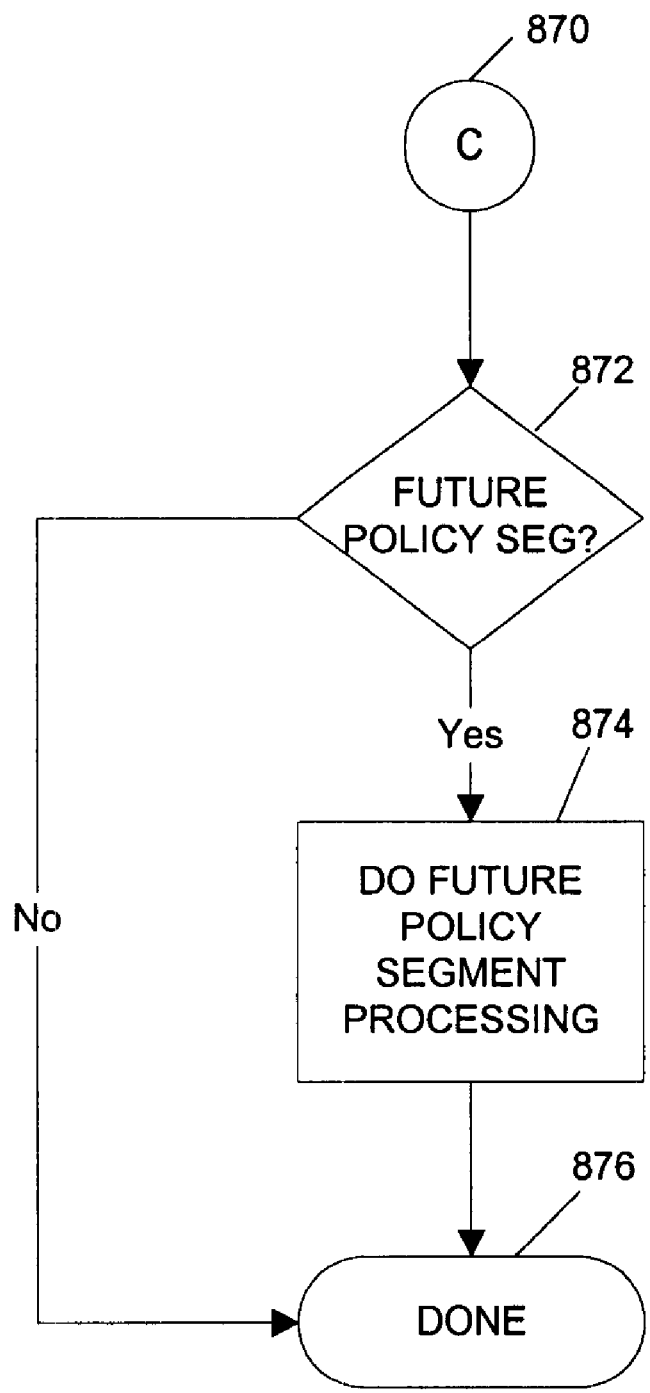

FIGS. 8A–8C illustrate the processing logic associated with generating device policies based on a policy segment definition. Processing begins in logic block 800 with expansion of the device list to individual devices. In decision block 802, a test is made to determine if IPsec policy segment is selected. If an IPsec policy segment is selected, then in decision block 804, a test is made to determine if the connection type is mesh. If it is, then in logic block 806, a paired list of devices is built that represents an all-to-all relationship between the devices and the expanded list. Processing continues in logic block 814 as described further below. If the connection type in decision block 804 is not mesh, processing continues in decision block 808 with a determination of whether or not the connection type is star (i.e., hub-based). If the connection type is star, then in logic block 810, a paired list of devices representing an all-to-all relationship between the devices in the expanded list is built. If the connection type in decision block 808 is not a star connection, then in logic block 812, a paired list of devices representing a one-to-one relationship between two devices in the expanded list is built.

Whether the connection type is mesh, star or single device to single device, processing continues in logic block 814 after the building of paired lists in logic blocks 806, 810 or 812. In logic block 814, the device pair is set to the first entry in the paired list of devices. Processing continues in logic block 822 in FIG. 8B. If in decision block 802, a determination is made that an IPsec policy segment is not selected, processing continues at decision block 842 in FIG. 8B.

Continuing with the description of IPsec policy segment processing, in decision block 846 a test is made to determine if the device pair is equal to null, meaning that the end of the expanded list has been reached. If it has, then processing is completed and exits at termination block 832. Otherwise, processing continues in logic block 824 with the building of the VPN policy for the first device in a device pair using the components contained in the IPsec policy template in device specific information contained in the device view definition. The policy is written to the LDAP Server in logic block 826. The VPN policy for the second device in the device pair is built in logic block 828 in similar fashion as that for the first device in the pair. Next, in logic block 830, the device pair is incremented by one to process the next pair of devices in the device list. Processing loops back to decision block 822 to determine if the end of the device list has been reached.

If the selected policy segment in decision block 802 in FIG. 8 is not IPsec, further processing continues in decision block 842, where a test is made to determine if a DiffServ or RSVP policy segment has been selected. If neither DiffServ nor RSVP has been selected, processing continues in decision block 872 in FIG. 8C. Otherwise, processing continues in logic block 844 by setting the device to the first device in the expanded list. This is followed in decision block 846 by testing if the device is set to null, signifying the end of the device list. If the device is set to null, then processing terminates in termination block 860. If the device is not set to null, then in logic block 848, a VPN policy is built for the device using the components in the policy template and the components contained in the QoS traffic template. The VPN policy is then written to the LDAP server in logic block 850. This is followed in decision block 852 with a test of whether or not the policy is bi-directional. If it is not, then the device is incremented to the next device on the device list in logic block 858, followed by a loop back to decision block 846. If the VPN policy is bi-directional, then in logic block 854, a second policy is built for the device. This second policy is written to the LDAP server in logic block 856. The device is then incremented to the next device in the device list and processing returns to decision block 846.

FIG. 8C illustrates the processing performed if the policy segment selected is not IPsec, DiffServ or RSVP. A test is made in decision block 872 to determine if a "future" policy segment has been selected. If it has, then in logic block 874 "future" policy segment processing is performed. Processing ends in termination block 876.

The VPN policy generation system of the present invention has been described as a computer program that can be resident on one or more host computers such as a network device, a network management platform, or a server, apart from the service provider's network infrastructure. As such, the VPN policy generation system can be stored as an application on any VPN network device. It is important to note, however, that those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as diskettes or CD ROMs and transmission type media such as analog or digital communications links.

Additionally, the corresponding structures, materials, acts, and equivalents of any means plus function elements in the claims below are intended to include any structure, material, or acts for performing the functions in combination with other claimed elements as specifically claimed.

While the invention has been particularly shown and described with reference to a preferred embodiment thereof, it will be understood by those skilled in the art that various changes in form and detail may be made without departing from the spirit and scope of the invention.

What is claimed is:

1. A method for generating a plurality of policies in a Virtual Private Network (VPN) wherein each policy includes a condition and at least one action and in which the VPN is defined by a sum of a plurality of policy segments, the method comprising:

grouping a plurality of VPN devices into a policy segment based on common policy components, each policy segment being defined by specifying a device list, a topology connection type and a policy template, said policy segment device list comprising a user-defined collection of other device lists or device interface profiles, each device interface profile containing device specific information that is needed to generate a traffic profile and an Internet Protocol Security (IPSec) data management action component for the policy segment;

generating policies for the grouped VPN devices based on the policy segment definition; and writing each VPN device policy to a server device for storage.

2. The method for generating a plurality of policies of claim 1 wherein the device specific information includes Internet Protocol (IP) addresses.

3. The method for generating a plurality of policies of claim 1 wherein an Internet Protocol Security (IPsec) policy segment topology connection type is a mesh connection in which each device in the policy segment is connected to every other device in the policy segment.

4. The method for generating a plurality of policies of claim 3 further comprising:

expanding the device list to individual VPN devices; and building a paired list of devices representing an all-to-all relationship between the VPN devices in the expanded list.

5. The method for generating a plurality of policies of claim 4 further comprising:

building a policy for each device in a paired list of devices; and writing the policy for each device in a paired list of devices to a Light Weight Directory Access Protocol (LDAP) server device.

6. The method for generating a plurality of policies of claim 1 wherein an Internet Protocol Security (IPsec) policy segment topology connection type is a star connection between a designated hub device and every other device in the policy segment.

7. The method for generating a plurality of policies of claim 6 further comprising:

expanding the device list to individual VPN devices;

building a paired list of devices representing a hub-to-all relationship between the VPN devices in the expanded list.

8. The method for generating a plurality of policies of claim 7 further comprising:

building a policy for each device in a paired list of devices; and writing the policy for each device in a paired list of devices to a Light Weight Directory Access Protocol (LDAP) server device.

9. The method for generating a plurality of policies of claim 1 wherein an Internet Protocol Security (IPsec) policy segment topology connection type is a specific device pair configuration between two devices in the policy segment.

10. The method for generating a plurality of policies of claim 9 further comprising:

expanding the device list to individual VPN devices;

building a paired list of devices representing a single device to single device relationship between the two devices in the expanded list.

11. The method for generating a plurality of policies of claim 10 further comprising:

building a policy for each device in a paired list of devices; and writing the policy for each device in a paired list of devices to a Light Weight Directory Access Protocol (LDAP) server device.

12. The method for generating a plurality of policies of claim 1 wherein the policy segment policy template contains the condition and action references that are used to generate policies for the policy segment.

13. The method for generating a plurality of policies of claim 1 wherein the policy condition includes a validity period and a traffic profile template.

14. The method for generating a plurality of policies of claim 13 wherein the traffic profile template includes all the attributes of a traffic profile except device specific information such as IP addresses.

15. The method for generating a plurality of policies of claim 1 wherein the policy action is at least one of an IPsec action, a Differential Services (DiffServ) action or a Reservation Setup Protocol (RSVP) action.

16. The method for generating a plurality of policies of claim 15 further comprising for a DiffServ or RSVP policy segment:

expanding the device list to individual VPN devices;

building a policy for each device in the device list; and writing the policy for each device to a Light Weight Directory Protocol (LDAP) server device.

17. The method for generating a plurality of policies of claim 16 further including for each bi-directional policy:

building a second policy for the corresponding device; and writing the second policy to the LDAP server device.

18. The method for generating a plurality of policies of claim 1 wherein the server device uses a Light Weight Directory Access Protocol (LDAP).

19. A computer readable medium containing a computer program product that generates a plurality of policies in a Virtual Private Network (VPN) wherein each policy includes a condition and at least one action and in which the VPN is defined by a sum of a plurality of policy segments, the computer program product comprising:

program instructions that group a plurality of VPN devices into a policy segment based on common policy components, each policy segment being defined by specifying a device list, a topology connection type and a policy template, each policy segment device list comprising a user-defined collection of other device lists or device interface profiles, each device interface profile containing device specific information that is needed to generate a traffic profile and an Internet Protocol Security (IPsec) data management action component for the policy segment;

program instructions that generate policies for the grouped VPN devices based on the policy segment definition; and program instructions that write each VPN device policy to a server device for storage.

20. The computer program product that generates a plurality of policies of claim 19 wherein the device specific information includes Internet Protocol (IP) addresses.

21. The computer program product that generates a plurality of policies of claim 19 wherein an Internet Protocol Security (IPsec) policy segment topology connection type is a mesh connection in which each device in the policy segment is connected to every other device in the policy segment.

22. The computer program product that generates a plurality of policies of claim 21 further comprising:

program instructions that expand the device list to individual VPN devices; and program instructions that build a paired list of devices representing an all-to-all relationship between the VPN devices in the expanded list.

23. The computer program product that generates a plurality of policies of claim 22 further comprising:

program instructions that build a policy for each device in a paired list of devices;

program instructions that write the policy for each device in a paired list of devices to a Light Weight Directory Access Protocol (LDAP) server device.

24. The computer program product that generates a plurality of policies of claim 19 wherein an Internet Protocol Security (IPsec) policy segment topology connection type is a star connection between a designated hub device and every other device in the policy segment.

25. The computer program product that generates a plurality of policies of claim 24 further comprising:

program instructions that expand the device list to individual VPN devices;

program instructions that build a paired list of devices representing a hub-to-all relationship between the VPN devices in the expanded list.

26. The computer program product that generates a plurality of policies of claim 25 further comprising:

program instructions that build a policy for each device in a paired list of devices;

program instructions that write the policy for each device in a paired list of devices to a Light Weight Directory Access Protocol (LDAP) server device.

27. The computer program product that generates a plurality of policies of claim 19 wherein an Internet Protocol Security (IPsec) policy segment topology connection type is a specific device pair configuration between two devices in the policy segment.

28. The computer program product that generates a plurality of policies of claim 27 further comprising:

program instructions that expand the device list to individual VPN devices;

program instructions that build a paired list of devices representing a single device to single device relationship between the two devices in the expanded list.

29. The computer program product that generates a plurality of policies of claim 28 further comprising:

program instructions that build a policy for each device in a paired list of devices;

program instructions that write the policy for each device in a paired list of devices to a Light Weight Directory Access Protocol (LDAP) server device.

30. The computer program product that generates a plurality of policies of claim 19 wherein the policy segment policy template contains the condition and action references that are used to generate policies for the policy segment.

31. The computer program product that generates a plurality of policies of claim 19 wherein the policy condition includes a validity period and a traffic profile template.

32. The computer program product that generates a plurality of policies of claim 31 wherein the traffic profile template includes all the attributes of a traffic profile except device specific information such as IP addresses.

33. The computer program product that generates a plurality of policies of claim 19 wherein the policy action is at least one of an IPsec action, a Differential Services (DiffServ) action or a Reservation Setup Protocol (RSVP) action.

34. The computer program product that generates a plurality of policies of claim 33 further comprising for a DiffServ or RSVP policy segment:

A program instructions that expand the device list to individual VPN devices;

program instructions that build a policy for each device in the device list; and program instructions that write the policy for each device to a Light Weight Directory Protocol (LDAP) server device.

35. The computer program product that generates a plurality of policies of claim 34 further including for each bi-directional policy:

program instructions that build a second policy for the corresponding; and program instructions that write the second policy to the LDAP server device.

36. The computer program product that generates a plurality of policies of claim 19 wherein the server device uses a Light Weight Directory Access Protocol (LDAP).

37. A system for generating a plurality of policies in a Virtual Private Network (VPN) including a plurality of network devices, a server device, and a manager application resident on at least one network device, wherein each policy includes a condition and at least one action and in which the VPN is defined by a sum of a plurality of policy segments, the manager application comprising:

an input module for grouping a plurality of VPN devices into a policy segment based on common policy components, each policy segment being defined by specifying a device list, a topology connection type and a policy template, each policy segment device list comprising a user-defined collection of other device lists or device interface profiles, each device interface profile containing device specific information that is needed to generate a traffic profile and an Internet Protocol Security (IPsec) data management action component for the policy segment;

a logic module for generating policies for the grouped VPN devices based on the policy segment definition; and an output module for writing each VPN device policy to the server device for storage.

38. The method for generating a plurality of policies of claim 37 wherein the device specific information includes Internet Protocol (IP) addresses.

39. The system for generating a plurality of policies of claim 37 wherein an Internet Protocol Security (IPsec) policy segment topology connection type is a mesh connection in which each device in the policy segment is connected to every other device in the policy segment.

40. The system for generating a plurality of policies of claim 39, wherein the management application further comprises:

a logic module for expanding the device list to individual VPN devices; and a logic module for building a paired list of devices representing an all-to-all relationship between the VPN devices in the expanded list.

41. The system for generating a plurality of policies of claim 40, wherein the management application further comprises:

a logic module for building a policy for each device in a paired list of devices; and a logic module for writing the policy for each device in a paired list of devices to a Light Weight Directory Protocol be (LDAP) server device.

42. The system for generating a plurality of policies of claim 31 wherein an Internet Protocol Security (IPsec) policy segment topology connection type is a star connection between a designated hub device and every other device in the policy segment.

43. The system for generating a plurality of policies of claim 42, wherein the management application further comprises:

a logic module for expanding the device list to individual VPN devices; and a logic module for building a paired list of devices representing a hub-to-all relationship between the VPN devices in the expanded list.

44. The system for generating a plurality of policies of claim 43, wherein the management application further comprises:

a logic module for building a policy for each device in a paired list of devices; and a logic module for writing the policy for each device in a paired list of devices to a Light Weight Directory Protocol (LDAP) server device.

45. The system for generating a plurality of policies of claim 37 wherein an Internet Protocol Security (IPsec) policy segment topology connection type is a specific device pair configuration between two devices in the policy segment.

46. The system for generating a plurality of policies of claim 45, wherein the management application further comprises:

a logic module for expanding the device list to individual VPN devices: and a logic module for building a paired list of devices representing a single device to single device relationship between the two devices in the expanded list.

47. The system for generating a plurality of policies of claim 46, wherein the management application further comprises:

a logic module for building a policy for each device in a paired list of devices; and a logic module for writing the policy for each device in a paired list of devices to a Light Weight Directory Access Protocol (LDAP) server device.

48. The system for generating a plurality of policies of claim 37 wherein the policy segment policy template contains the condition and action references that are used to generate policies for the policy segment.

49. The system for generating a plurality of policies of claim 37 wherein the policy condition includes a validity period and a traffic profile template.

50. The system for generating a plurality of policies of claim 49 wherein the traffic profile template includes all the attributes of a traffic profile except device specific information such as IP addresses.

51. The system for generating a plurality of policies of claim 37 wherein the policy action is at least one of an IPsec action, a Differential Services (DiffServ) action or a Reservation Setup Protocol (RSVP) action.

52. The system for generating a plurality of policies of claim 37 further comprising for a DiffServ or RSVP policy segment:

a logic module for expanding the device list to individual VPN devices;

a logic module for building a policy for each device in the device list; and a logic module for writing the policy for each device to a Light Weight Directory Protocol (LDAP) server device.

53. The system for generating a plurality of policies of claim 52 further including for each bi-directional policy:

a logic module for building a second policy for the corresponding device; and a logic module for writing the second policy to the LDAP server device.

54. The system for generating a plurality of policies of claim 37 wherein the server device uses a Light Weight Directory Access Protocol (LDAP).

* * * * *